United States Patent [19]

Borzym

[11] Patent Number: 4,848,723
[45] Date of Patent: Jul. 18, 1989

[54] OVERLOAD PROTECTOR FOR CLAMPING JAW MECHANISM

[76] Inventor: John J. Borzym, 4820 Schoolbell, Birmingham, Mich. 48010

[21] Appl. No.: 700,811

[22] Filed: Feb. 11, 1985

[51] Int. Cl.⁴ .................. B23D 21/00; B23D 25/04
[52] U.S. Cl. .................... 269/157; 83/319; 83/320; 83/382; 83/456; 83/700; 83/54; 269/234
[58] Field of Search .................. 83/318–320, 83/54, 698–700, 382, 456; 267/172; 269/157, 162, 234

[56] References Cited

U.S. PATENT DOCUMENTS 4,392,644  7/1983  Borzym ........................ 83/319 X

FOREIGN PATENT DOCUMENTS 560086  5/1977  U.S.S.R. .......................... 267/172

Primary Examiner—Frank T. Yost
Assistant Examiner—Eugenia A. Jones
Attorney, Agent, or Firm—Krass & Young

[57] ABSTRACT

An overload protection device for the clamping portion of a tube cutoff die set. The overload protection device is used to prevent destructive overload forces in the event a mechanical obstruction prevents the tube clamping die jaws from fully closing in response to the forces applied by a control cam. The overload protector comprises a wedge mounted between rollers. If overload occurs the wedge is squeezed out of position against the operation of a compression spring. After the overload condition is eliminated the wedge is returned to position by the compression spring.

1 Claim, 2 Drawing Sheets

OVERLOAD PROTECTOR FOR CLAMPING JAW MECHANISM

INTRODUCTION

This invention relates to cutoff apparatus for elongated stock such as steel tubing and more particularly to an apparatus for preventing distructive overload forces in the workpiece clamping system.

BACKGROUND OF THE INVENTION

Shear-type cutoff apparatus for elongated stock such as tubing typically comprises an arrangement of platens which can be driven relative to one another to cause one or more blades to pass through the stock to perform the shearing or severing function. In the case of tubing and certain other shapes, it is highly desirable, if not necessary, to clamp the cutoff apparatus to the workpiece immediately before, during, and immediately after the shearing function to prevent any relative motion between the stock and the cutoff apparatus which might effect the quality of the cut or even tend to break the cutoff blade. A cutoff apparatus of this general type is disclosed in the U.S. Pat. No. 4,108,029 issued Aug. 22, 1978 to Alexander Borzym.

To operate the clamping system of the cutoff apparatus described above, clamping jaws are disposed on respective slide members each of which is provided with a cam follower roller. A depending cam extends between the rollers and varies in effective thickness so as to program relative displacement between the rollers and the slide members to which the rollers are connected. In this fashion longitudinal motion of the cam, usually coordinated with motion of the platen which carries the shearing blade, programs or controls the movement of the slides and the associated clamping jaws.

As illustrated in the aforementioned U.S. Pat. No. 4,108,029, the clamping system is essentially all-mechanical and requires a close tolerance and proper fitting relationship between the various parts thereof as well as between the clamping jaws and the workpiece for proper operation. If a mechanical obstruction prevents the clamping jaws from closing on the workpiece when the cam enters the space between the follower rollers, an overload condition can occur and this is likely, if great enough, to result in a structural failure of one of the parts of the die clamping arrangement.

One approach to the avoidance of the overload circumstances described above is disclosed in U.S. Pat. No. 4,437,374 issued Mar. 20, 1984 to John J. Borzym. In the apparatus described in that patent one of the clamping apparatus follower rollers is mounted for spring-biased travel relative to the die jaw slide member with which it is associated such that the roller is permitted to "give" in a yielding and resilient fashion in the event a mechanical obstruction prevents the die jaws from closing completely.

Although the apparatus disclosed in the aforesaid U.S. Pat. No. 4,437,374 has proven satisfactory, it has been found desirable to use relatively heavy springs to bias the resiliently mounted follower roller so that low level forces produced relatively little displacement between the roller and its associated slide. All springs, as is well known, follow Hooke's Law and produce a proportional displacement in response to even a small load. Moreover springs are responsive to abrupt shock loads of higher magnitude to displace farther than desired and then rebound and this has been found to give rise to unnecessary travel and wear in the clamping apparatus. It would be desirable to utilize an overload system having the characteristics of a solid mechanical connection for normal loads i.e., loads of less than a predetermined level, and having the characteristics of a spring or resilient connection for loads in excess of said predetermined level.

SUMMARY OF THE INVENTION

In accordance with the subject invention an improved overload protection system in the clamping portion of a cutoff apparatus is provided. In general the invention comprises a non-linear, load responding control means disposed between the follower element of a cam operated clamping system and the clamp slide associated with said follower element, which control means, for applied loads which are not in excess of a predetermined level, provides a solid mechanical connection but which, for loads in excess of the predetermined level, yields in the manner of a spring to permit relative displacement between the follower and the associated clamping structure in the event of overload due to mechanical obstruction or the like.

In the preferred embodiment the control means comprises a wedge shaped element disposed between rollers and held in place by biasing means such as a partially compressed transverse spring. When the loads transmitted through the mechanical element from a pressure roller on one side and one or more back stop rollers on the other side are less than some predetermined value, the wedge element simply remains in place and functions as a solid mechanical component to transmit the entirety of the load. However, when the load exceeds the predetermined value the wedge element tends to be "squeezed" out of position against the operation of the transverse spring to permit relative displacement between the pressure and back stop rollers and a proportional accommodation of what would otherwise be an overload condition. The transverse spring is effective to restore the wedge element to its original position between the rollers after the overload condition has been corrected.

DETAILED DESCRIPTION OF THE SPECIFIC EMBODIMENT

Figure 1:
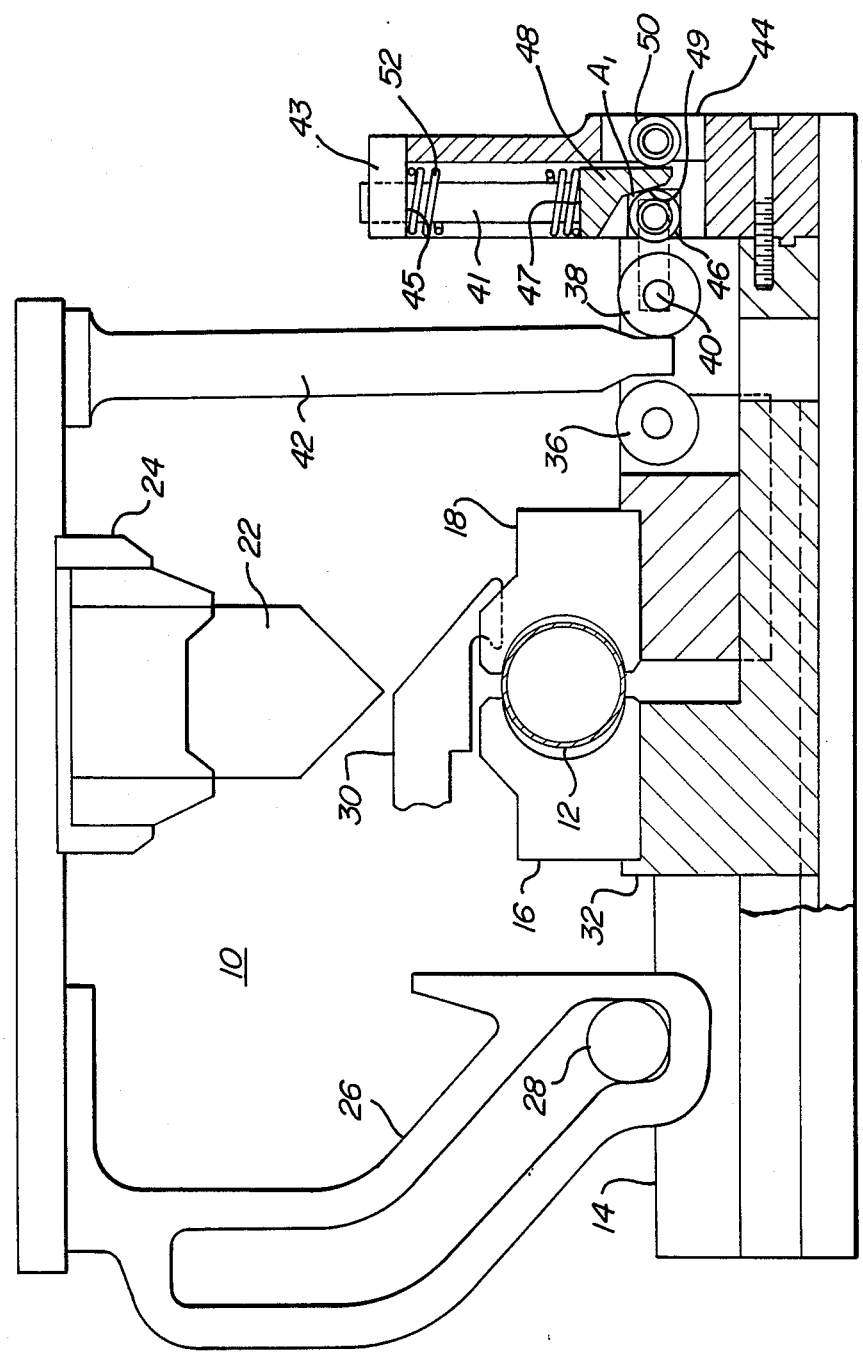
FIG. 1 is a front view partially in section of a tubing cutoff apparatus embodying the overload protection system of the subject invention.

Referring now to the drawings and particularly to FIG. 1, the invention is embodied in an apparatus 10 for shearing steel tubing 12 into desired lengths. Apparatus 10 comprises a base or lower platen assembly 14 adapted to indirectly carry steel clamping jaws 16 and 18 which are configured to surround and clamp the tubing 12 in place during a severing or shearing operation. Apparatus 10 further comprises an upper platen 20 which, as will be apparent from a reading of either of the aforementioned previously issued patents, is mounted on guide posts (not shown) for vertical reciprocation relative to the lower platen assembly 14 under the control of a mechanical power source such as a press or cylinder. Upper platen 20 carries a shearing blade 22 and a suitable blade holder 24, the blade being lined up relative to the tubing 12 and the clamping jaws 16 and 18 to descend with the upper platen 20 through a section of the tubing to shear it completely and cleanly through.

If a dimple free cut is desired, apparatus 10 may be provided with a cam 26 which depends from the upper platen 20 and operates in conjunction with a follower roller 28 to control the operation of a transversely moving notching blade 30 the operative end of which is pulled across through an upper section of the tubing 12 to provide a notch through which the severing blade 22 descends later in the sequence of events. As will be apparent to those skilled in the art this tends to reduce the tendency of the tubing 12 to collapse under the initial pressure exerted by the shearing blade 22 and minimizes or eliminates the necessity for end finishing operations.

Clamping jaw 16 is mounted and secured by machine screws and other suitable fasteners more fully described in the aforementioned U.S. Pat. No. 4,437,374 to a slide member 32 which is mounted directly on the lower platen or base 14 for back and forth sliding motion transverse to the axis of the tubing 12. Similarly jaw 18 is mounted on a slide member 34 which in turn is mounted on a top flat surface of the slide member 32 so that the two slide members 32 and 34 can move relative to one another in a "piggyback" fashion. Although the invention is being described with reference to jaws 16 and 18 as if they were a single set of elements, it is more typical to utilize four jaws spaced apart in the longitudinal direction of the tubing 12 sufficiently to define a blade gap or space to accommodate the blades 22 and 30. However, for the sake of simplicity the invention is described with reference to single jaws 16 and 18 since the double jaws are mounted in a straight forward fashion on the slides 32 and 34.

A follower roller 36 is mechanically rotatably connected to the slide 34. A second follower roller 38 is mounted on a post 40 which is slidably disposed on the base platen 14. A vertically depending cam 42 is mounted on the right side of the upper platen 20 as shown in FIG. 1 and extends into the gap or space between the rollers 36 and 38. As clearly seen in FIGS. 1 through 4, the cam 42 varies in effective thickness or width and hence serves as a control device to vary the spacing between the rollers 36 and 38 according to the vertical position 20. As will become more apparent hereinafter, the overall function of the cam 42 is to permit the jaws 16 and 18 to assume the open condition shown in FIG. 1 when the platen 20 is in the fully raised position but to cause the jaws 16 and 18 to come together or close to securely clamp the tubing 12 when the upper platen 20 moves toward the lower platen 14.

Continuing with the description of the apparatus shown in the drawing, stop means in the form of steel structure 44 is secured to slide 32 by means of machine screws and the like and carries thereon a pressure roller 46 and a back stop roller 50 each of which are preferably in the same horizontal plane as rollers 36 and 38 but which do not normally slide or move in any fashion (except to rotate as necessary) relative to the lower platen 14. Between the rollers 46 and 50 is located a wedge element 48. The wedge element 48 preferably includes a shaft portion 41 which is mounted for vertical displacement within a collar 43 affixed to the steel structure 44. A spring 52 encircles the shaft portion 41 of the wedge element 48 and is positioned between the shoulder portion 45 of the collar 43 and the shoulder portion 47 of the wedge element 48. The spring 52 biases the wedge element 48 into its normal rest position between the pressure roller 46 and the back stop roller 50 as shown in FIGURE 1, but will yield to permit the wedge element 48 to be pushed or squeezed upwardly when the force exerted by roller 46 in the direction of roller 50 becomes excessive. It should be noted that the vertical component of the force transmitted by roller 46, in direct opposition to the force exerted by the coil spring 52, is a function of the angle of incline $A_1$ of the contacting face 49 on the wedge element 48. In the preferred embodiment the angle of incline is approximately 8°.

Figure 2:
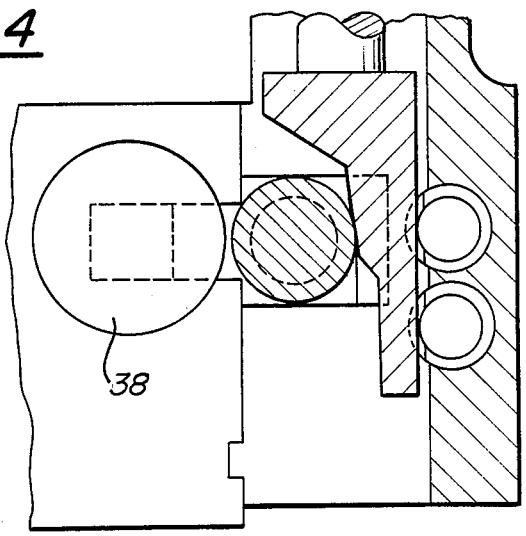
FIG. 2 is a partial front view of a second embodiment of the subject invention.

A second embodiment of the invention, employing a wedge element 48 having a modified shape and a pair of parallel back stop rollers 51 and 53 is shown in FIG. 2.

Figure 3:
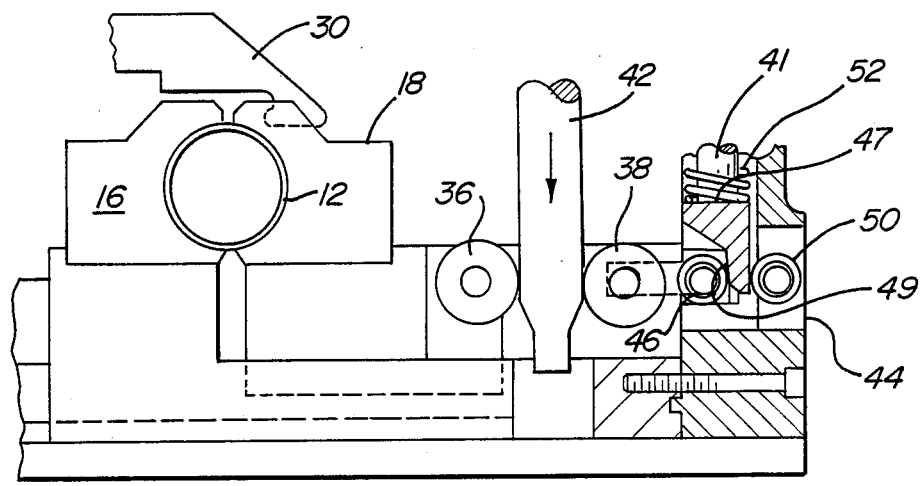
FIG. 3 is a partial view of the apparatus of FIG. 1 in an overload condition.
Figure 4:
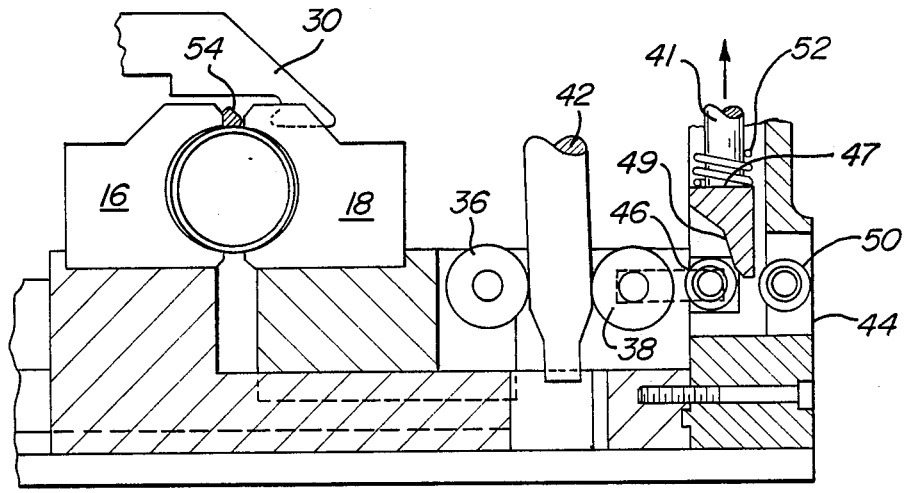
FIG. 4 is another partial view of a more aggravated overload condition.

Describing now the operation of the apparatus as shown in the drawings with particular reference to FIGS. 3 and 4, the spacing between the rollers 36 and 38, and rollers 46 and 50 as well as the dimensions of the wedge 48 and the specifications of the spring 52 are selected so that under normal operating conditions wherein no mechanical obstructions prevent proper closing of the die jaws 16 and 18 vertically, downward movement of the platen 20 toward the lower platen 14 causes the thicker portion of the cam 42 to enter into the space between the rollers 36 and 38 and drive those rollers apart. The force exerted on roller 38 is transmitted fully and directly to roller 46 and by roller 46 through the solid steel wedge element 48 to the roller 50. There is no relative displacement between the rollers 46 and 50 and the roller 50 thus pulls the slide member 32 to the right while the roller 36 pushes the slide member 34 to the left and the die jaws are closed.

If however a mechanical obstruction such as an improper fit between the die jaws 16 and 18 and the tubing 12 occurs, the die jaws 16 and 18 cannot fully close despite the fact that the cam 42 is forced into position between the rollers 36 and 38. Under these conditions the force exerted between rollers 46 and 50 exceeds the aforementioned predetermined level and the wedge 48 is squeezed until it displaces upwardly against the spring 52 until it assumes the position shown in FIG. 3. Because of the continuing taper of the element 48 any additional overload simply drives the element 48 farther upward and produces additional compression of spring 52.

Another overload condition, as shown in FIGURE 3 of the drawing, this time caused by the presence of a steel chip 54 in the space between the die jaws 16 and 18. This mechanical obstruction prevents the jaws from fully closing despite the fact that the cam 42 is descended into the space between the rollers 36 and 38. In this case the wedge element 48 is fully driven into the uppermost position and fully compresses spring 52. This allows relative displacement between rollers 38 and 40 to accommodate the cam 42 but without producing an overload condition in an effort to force the lower slide member 32 into farther displacement to the right as shown in FIG. 4. When the overload condition is removed the spring 52 pushes the wedge element 48 back into position.

Figure 5:
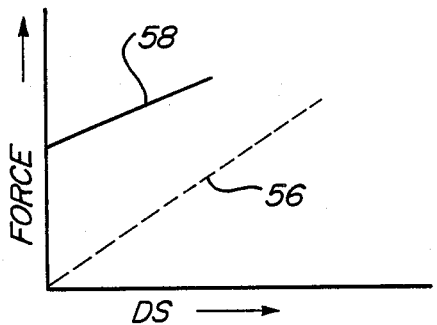
FIG. 5 is a graph of force versus relative displacement between certain components in the apparatus of FIGS. 1 through 4.

FIG. 5 is a graph of displacement between rollers 46 and 50 along the X axis relative to applied force on the Y axis. Dotted line 56 is the usual Hooke's Law curve which results from the use of a spring as the overload protector and illustrates or indicates the linear give or displacement with load which results from the use of standard spring. Solid line 58 illustrates the non-linear characteristics of the present invention wherein the force can rise to the predetermined level represented by the sharp break in the line 56 producing no relative displacement between the rollers 46 and 50 whatsoever. However when the force exceeds the predetermined level represented by the break point, the abrupt displacement of the wedge element 48 occurs and thereafter the spring 52 produces a soft but linear yield characteristic. As previously noted, this predetermined level can be varied by employing springs of various spring bias or preload pressure and by varying the angle of incline A1 of the contact face 49 on the wedge element 48. For example, increasing the angle of incline of the contacting face 49 allows for a greater portion of the force exerted upon the wedge element 48 by the roller 46 to be in the vertical direction, directly opposing the spring force.

I claim:

1. In a tube or closed shape cut-off apparatus of the type comprising first and second workpiece clamping members mounted on first and second slide members, respectively, cam means for programming relative movement between the slide members according to the vertical position of an upper platen relative to a lower platen, and first and second cam follower means mechanically connected to the first and second slide members, respectively, and operatively associated with said cam means for opening and closing the clamping members according to the position of said cam means relative to said follower means, the improvement wherein one of said follower means comprises:

a stop roller connected to one of said slide members;

a pressure roller, having a rotational axis parallel to but spaced from the rotational axis of said stop roller, operatively associated with said cam means and mounted for slideable movement toward said stop roller;

a rigid overload control member mounted for movement along a line generally normal to said axes and having a wedge-shaped portion at one end thereof disposed between said pressure roller and said stop roller with an angled face of said wedge-shaped portion operative in response to movement of said pressure roller toward said stop roller to generate a force component tending to squeeze said wedge portion out from between said rollers; and a compression spring biasing said overload control member for movement along said line in a direction to further insert said wedge-shaped portion between said rollers and thereby tend to urge said rollers apart;

whereby, in response to an overload condition between said clamping members, said wedge-shaped portion is squeezed out from between said stop roller and said pressure roller against the resistance of said spring to allow said rollers to move toward one another to relieve the overload condition.

* * * * *